United States Patent
Yang et al.

(10) Patent No.: US 12,044,925 B2
(45) Date of Patent: Jul. 23, 2024

(54) DISPLAY BACKPLANE AND DISPLAY DEVICE

(71) Applicant: WUHAN CHINA STAR OPTOELECTRONICS TECHNOLOGY CO., LTD., Wuhan (CN)

(72) Inventors: Yong Yang, Wuhan (CN); Fancheng Liu, Wuhan (CN); Guowei Zha, Wuhan (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/635,896

(22) PCT Filed: Jan. 26, 2022

(86) PCT No.: PCT/CN2022/073896
§ 371 (c)(1),
(2) Date: Feb. 16, 2022

(87) PCT Pub. No.: WO2023/137780
PCT Pub. Date: Jul. 27, 2023

(65) Prior Publication Data
US 2024/0036395 A1 Feb. 1, 2024

(30) Foreign Application Priority Data
Jan. 18, 2022 (CN) .......................... 202210056714.9

(51) Int. Cl.
*G02F 1/13357* (2006.01)

(52) U.S. Cl.
CPC .. *G02F 1/133605* (2013.01); *G02F 1/133603* (2013.01); *G02F 1/133606* (2013.01)

(58) Field of Classification Search
CPC ......... G02F 1/133605; G02F 1/133603; G02F 1/133608; G02F 1/133611; G02F 1/13336; F21V 7/0083
See application file for complete search history.

(56) References Cited

U.S. PATENT DOCUMENTS 10,670,919 B2 * 6/2020 Yamano ............ G02F 1/133606
11,906,156 B2 * 2/2024 Yamada ............ G02F 1/133606
(Continued)

FOREIGN PATENT DOCUMENTS

CN 1877418 A 12/2006
CN 103489984 A 1/2014
(Continued)

*Primary Examiner* — Erin Kryukova
(74) *Attorney, Agent, or Firm* — The Roy Gross Law Firm, LLC; Roy Gross (57) ABSTRACT

The present application discloses a display backplane and a display device. The display backplane includes a plurality of light-emitting sub-areas; each of the light-emitting sub-areas is provided with at least two light-emitting portions; a first light-guiding portion is arranged in each of the light-emitting sub-areas and is located between the at least two light-emitting portions, and a side of the first light-guiding portion close to the light-emitting elements has a second light-reflecting surface, and an orthographic projection of a portion of a side of the first light-guiding portion away from the substrate on the substrate falls within an orthographic projection of a portion of a side of the first light-guiding portion close to the substrate on the substrate.

17 Claims, 10 Drawing Sheets

(56) References Cited

U.S. PATENT DOCUMENTS

| | | |
|---|---|---|
| 2010/0320482 A1 | 12/2010 | Tachibana |
| 2012/0120325 A1* | 5/2012 | Shimizu ............ G02F 1/133608 348/790 |
| 2012/0262631 A1* | 10/2012 | Kuromizu ......... G02F 1/133608 362/602 |
| 2013/0128128 A1* | 5/2013 | Ikuta ................ G02F 1/133605 349/67 |
| 2013/0194529 A1* | 8/2013 | Chang ............... G02F 1/133608 362/97.1 |
| 2013/0222705 A1* | 8/2013 | Shimizu .................... F21V 7/00 348/790 |
| 2017/0045779 A1* | 2/2017 | Kamiyoshihara ............................ G02F 1/133608 |
| 2017/0219884 A1* | 8/2017 | Yeo ................... G02F 1/133611 |
| 2019/0094616 A1* | 3/2019 | Kim ..................... G02B 6/0051 |
| 2020/0110311 A1* | 4/2020 | Gordon ............. G02F 1/133603 |
| 2020/0285117 A1 | 9/2020 | Hashimoto et al. |

FOREIGN PATENT DOCUMENTS

| | | | | |
|---|---|---|---|---|
| CN | 106684108 A | | 5/2017 | |
| CN | 107991805 A | | 5/2018 | |
| CN | 108563068 A | | 9/2018 | |
| CN | 108572481 A | * 9/2018 | ....... G02F 1/133605 |
| CN | 108572481 A | | 9/2018 | |
| CN | 108761910 A | | 11/2018 | |
| CN | 108878622 A | | 11/2018 | |
| CN | 109116631 A | | 1/2019 | |
| CN | 109844401 A | | 6/2019 | |
| CN | 110515241 A | | 11/2019 | |
| CN | 110609417 A | | 12/2019 | |
| CN | 211507676 U | | 9/2020 | |
| CN | 113161332 A | | 7/2021 | |
| CN | 113820888 A | | 12/2021 | |
| CN | 114280847 A | | 4/2022 | |
| JP | 6828794 B1 | | 2/2021 | |

* cited by examiner

DISPLAY BACKPLANE AND DISPLAY DEVICE

CROSS REFERENCE TO RELATED APPLICATIONS

This application is a National Phase of PCT Patent Application No. PCT/CN2022/073896 having International filing date of Jan. 26, 2022, which claims the benefit of priority of Chinese Application No. 202210056714.9 filed on Jan. 18, 2022. The contents of the above applications are all incorporated by reference as if fully set forth herein in their entirety.

BACKGROUND OF INVENTION

Field of Invention

The present application relates to the field of display technology, and in particular, relates to a display backplane and a display device containing the display backplane.

Description of Prior Art

Liquid crystal display (LCD) backlight technology is constantly evolving, from the original cold cathode fluorescent lamp (CCFL) backlight to surface mounted device light-emitting diode (SMD LED) backlight, to current mini LED backlight. Continuous development of backlight technology has continuously improved the display effect of LCD, allowing people to enjoy ultra-high-definition visual feast.

In the mini LED backlight, LED lamps of RGB three-colors can be directly used to achieve a display effect with no loss of RGB three primary colors, which have a color vividness comparable to that of OLED. In addition, mini LED can achieve uniform heat dissipation at high brightness, which is impossible to achieve for traditional discrete LED device solutions. Mini LED backlight can also achieve direct-lit LCD display, which can be developed in a lighter and thinner direction to be applied to AR/VR glasses, mobile phones, and notebook computers.

In the Mini LED backlight, there are multiple LED lamps, but the light emission of the LED lamps is generally divergent. The light directly above is stronger and the light at surrounding area becomes weaker, and then a luminous intensity between adjacent LED lamps will be weaker than a luminous intensity above each of the LED lamps, leading to a darker area between adjacent LED lamps, resulting in uneven brightness of the mini LED backlight.

SUMMARY OF INVENTION

Embodiments of the present application provide a display backplane and a display device, which can improve a light output intensity between light-emitting elements in the display backplane and improve a brightness uniformity of the display backplane.

An embodiment of the present application provides a display backplane, the display backplane includes a light-emitting area, and the light-emitting area includes a plurality of light-emitting sub-areas;
wherein the display backplane further includes:
a substrate;
a plurality of light-emitting elements disposed on the substrate and located in the light-emitting area, wherein each of the light-emitting sub-areas is provided with at least two of the light-emitting elements;
a retaining wall structure disposed on the substrate and between at least adjacent ones of the light-emitting sub-areas, so that the adjacent ones of the light-emitting sub-areas are spaced apart from each other, wherein a first light-reflecting surface is provided on a side of the retaining wall structure close to the light-emitting elements; and
a first light-guiding portion disposed in each of the light-emitting sub-areas and between at least two of the light-emitting elements, wherein a second light-reflecting surface is provided on a side of the first light-guiding portion close to the light-emitting elements, and an orthographic projection of a portion of a side of the first light-guiding portion away from the substrate on the substrate falls within an orthographic projection of a portion of a side of the first light-guiding portion close to the substrate on the substrate.

In one embodiment of the present application, at least one light-emitting element group is disposed in each of the light-emitting sub-areas, and each of the light-emitting element group includes a plurality of the light-emitting elements, wherein in each of the light-emitting element group, the plurality of the light-emitting elements are arranged around the first light-guiding portion.

In one embodiment of the present application, each of the light-emitting element group includes four light-emitting elements arranged in an array along a first direction and a second direction, and the first direction is perpendicular to the second direction;
wherein, in each of the light-emitting element group, a maximum difference between distances between the first light-guiding portion and each of the light-emitting elements is less than or equal to 0.2 mm.

In one embodiment of the present application, in each of the light-emitting sub-areas, the first light-guiding portion between adjacent ones of light-emitting groups is located at a symmetrical center of adjacent ones of the light-emitting groups.

In one embodiment of the present application, the display backplane further includes an optical film assembly disposed at a side of the plurality of light-emitting elements away from the substrate, the optical film assembly includes a diffuser sheet, and a number of the diffuser sheet is less than 3.

In one embodiment of the present application, a height of each of the light-emitting elements is smaller than a height of the retaining wall structure and smaller than a height of the first light-guiding portion.

In one embodiment of the present application, a reflectivity of the first light-reflecting surface is greater than or equal to 95%, and a reflectivity of the second light-reflecting surface is greater than or equal to 85%.

In one embodiment of the present application, the retaining wall structure is disposed around the light-emitting sub-areas, and the display backplane further includes a second light-guiding portion connected between the first light-guiding portion and the retaining wall structure, wherein, in each of the light-emitting sub-areas, the second light-guiding portion is provided between adjacent ones of the light-emitting elements, and a side of the second light-guiding portion close to the light-emitting elements is provided with a third light-reflecting surface.

In one embodiment of the present application, a height of the second light-guiding portion is smaller than a height of the first light-guiding portion and smaller than a height of the light-emitting elements.

In one embodiment of the present application, the light-emitting elements include a connecting sub-portion disposed on the substrate and a light-emitting sub-portion disposed at a side of the connecting sub-portion away from the substrate; and a height of the second light-guiding portion is greater than a height of the connecting sub-portion, and is smaller than a sum of heights of the connecting sub-portion and the light-emitting sub-portion.

In one embodiment of the present application, a material of the first light-guiding portion is same as a material of the second light-guiding portion, a reflectivity of the second light-reflecting surface is equal to a reflectivity of the second light-guiding portion, and a reflectivity of the third light-reflecting surface is greater than or equal to a reflectivity of the first light-reflecting surface.

In one embodiment of the present application, the reflectivity of the first light-reflecting surface is greater than or equal to 80% and less than or equal to 95%, and the reflectivity of the second light-reflecting surface is greater than or equal to 85% and less than or equal to 99%.

In one embodiment of the present application, in adjacent ones of the light-emitting sub-areas, a distance between one of the light-emitting elements in one of the light-emitting sub-areas close to an adjacent one of the light-emitting sub-areas and one of the light-emitting elements in the adjacent one of the light-emitting sub-areas close to the one of the light-emitting sub-areas is less than or equal to distances between adjacent ones of the light-emitting elements within each of the light-emitting sub-areas.

In one embodiment of the present application, the display backplane further includes an encapsulation adhesive layer disposed on the substrate; a side of the encapsulation adhesive layer close to the substrate covers the plurality of the light-emitting elements, the first light-guiding portion, and the retaining wall structure; and a side of the encapsulation adhesive layer away from the substrate is a plane.

In one embodiment of the present application, the first light-guiding portion includes a plurality of light-guiding sub-portions arranged in a direction away from the substrate, and between adjacent ones of the light-guiding sub-portions, an orthographic projection of the light-guiding sub-portions at a side away from the substrate on the substrate falls within an orthographic projection of the light-guiding sub-portions at a side close to the substrate on the substrate.

According to the above object of the present application, a display device is provided, the display device includes a display panel and a display backplane, the display panel and the display backplane are disposed opposite to each other, and the display panel is located at a side of a plurality of the light-emitting elements away from the substrate;

wherein the display backplane includes a light-emitting area, and the light-emitting area includes a plurality of light-emitting sub-areas; and wherein the display backplane further includes:

a substrate;

a plurality of light-emitting elements disposed on the substrate and located in the light-emitting area, wherein each of the light-emitting sub-areas is provided with at least two of the light-emitting elements;

a retaining wall structure disposed on the substrate and between at least adjacent ones of the light-emitting sub-areas, so that the adjacent ones of the light-emitting sub-areas are spaced apart from each other, wherein a first light-reflecting surface is provided on a side of the retaining wall structure close to the light-emitting elements; and a first light-guiding portion disposed in each of the light-emitting sub-areas and between at least two of the light-emitting elements, a second light-reflecting surface is provided on a side of the first light-guiding portion close to the light-emitting elements, and an orthographic projection of a portion of a side of the first light-guiding portion away from the substrate on the substrate falls within an orthographic projection of a portion of a side of the first light-guiding portion close to the substrate on the substrate.

In one embodiment of the present application, at least one light-emitting element group is disposed in each of the light-emitting sub-areas, and each of the light-emitting element group includes a plurality of the light-emitting elements, wherein in each of the light-emitting element group, the plurality of the light-emitting elements are arranged around the first light-guiding portion.

In one embodiment of the present application, each of the light-emitting element group includes four light-emitting elements arranged in an array along a first direction and a second direction, and the first direction is perpendicular to the second direction;

wherein, in each of the light-emitting element group, a maximum difference between distances between the first light-guiding portion and each of the light-emitting elements is less than or equal to 0.2 mm.

In one embodiment of the present application, in each of the light-emitting sub-areas, the first light-guiding portion between adjacent ones of light-emitting groups is located at a symmetrical center of adjacent ones of the light-emitting groups.

In one embodiment of the present application, the retaining wall structure is disposed around the light-emitting sub-areas, and the display backplane further includes a second light-guiding portion connected between the first light-guiding portion and the retaining wall structure, wherein, in each of the light-emitting sub-areas, the second light-guiding portion is provided between adjacent ones of the light-emitting elements, and a side of the second light-guiding portion close to the light-emitting elements is provided with a third light-reflecting surface.

Compared with the prior art, the present application provides a first light-guiding portion in each of the light-emitting sub-areas of the display backplane, and the first light-guiding portion is located between at least two light-emitting elements, and a side of the first light-guiding portion close to the light-emitting elements is provided with a light-reflecting surface, and the light-reflecting surface is arranged divergently away from the substrate, so that the light irradiated on the first light-guiding portion can emit in a direction that is biased towards a forward direction of the display backplane, so as to improve a light output intensity between the light-emitting elements in the display backplane, improve the uneven display of the display backplane, and improve the brightness uniformity of the display backplane.

BRIEF DESCRIPTION OF DRAWINGS

The technical solutions and other beneficial effects of the present application will be apparent through the detailed description of the specific embodiments of the present application in conjunction with the accompanying drawings.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

The following disclosure provides many different embodiments or examples for realizing different structures of the present application. To simplify the disclosure of the present application, the components and settings of specific examples are described below. Of course, they are only examples and are not intended to limit the present application. In addition, the present application may repeat reference numerals and/or reference letters in different examples. Such repetition is for the purpose of simplification and clarity, and does not indicate the relationship between the various embodiments and/or settings discussed. In addition, the present application provides examples of various specific processes and materials, but those of ordinary skill in the art may be aware of the present applications of other processes and/or the use of other materials.

An embodiment of the present application provides a display backplane, the display backplane includes a light-emitting area 101, and the light-emitting area 101 includes a plurality of light-emitting sub-areas 1011.

Further, the display backplane further includes a substrate 11, a plurality of light-emitting elements 12, a retaining wall structure 13 and a first light-guiding portion 14; the plurality of light-emitting elements 12 are disposed on the substrate 11 and are located in the light-emitting area 101, and each of the light-emitting sub-area 1011 is provided with at least two light-emitting elements 12; the retaining wall structure 13 is disposed on the substrate 11 and between at least adjacent ones of the light-emitting sub-areas 1011, so that adjacent ones of the light-emitting sub-areas 1011 are spaced apart from each other, wherein a first light-reflecting surface is provided on a side of the retaining wall structure 13 close to the light-emitting elements 12; the first light-guiding portion 14 is disposed in each of the light-emitting sub-areas 1011 and is located between at least two light-emitting elements 12, a second light-reflecting surface is provided on a side of the first light-guiding portion 14 close to the light-emitting elements 12, and an orthographic projection of a portion of a side of the first light-guiding portion 14 away from the substrate on the substrate 11 falls within an orthographic projection of a portion of a side of the first light-guiding portion 14 close to the substrate 11 on the substrate 11.

In an implementation and an application, in an embodiment of the present application, the first light-guiding portion 14 is arranged in each of the light-emitting sub-areas 1011 of the display backplane, the first light-guiding portion 14 is located between the at least two light-emitting elements 12, the second light-reflecting surface is provided on a side of the first light-guiding portion 14 close to the light-emitting elements 12, and the second light-reflecting surface is arranged in an inclination direction, that is, the second light-reflecting surface is arranged in a direction perpendicular to the substrate or arranged divergently in a direction away from the substrate, so that the light irradiated on the first light-guiding portion 14 can emit in a direction that is biased towards a forward direction of the display backplane, so as to improve a light output intensity between the light-emitting elements 12 in the display backplane, improve the uneven display of the display backplane, and improve the brightness uniformity of the display backplane.

The display backplane provided in the embodiments of the present application will be described in detail below with reference to specific embodiments.

Figure 1:
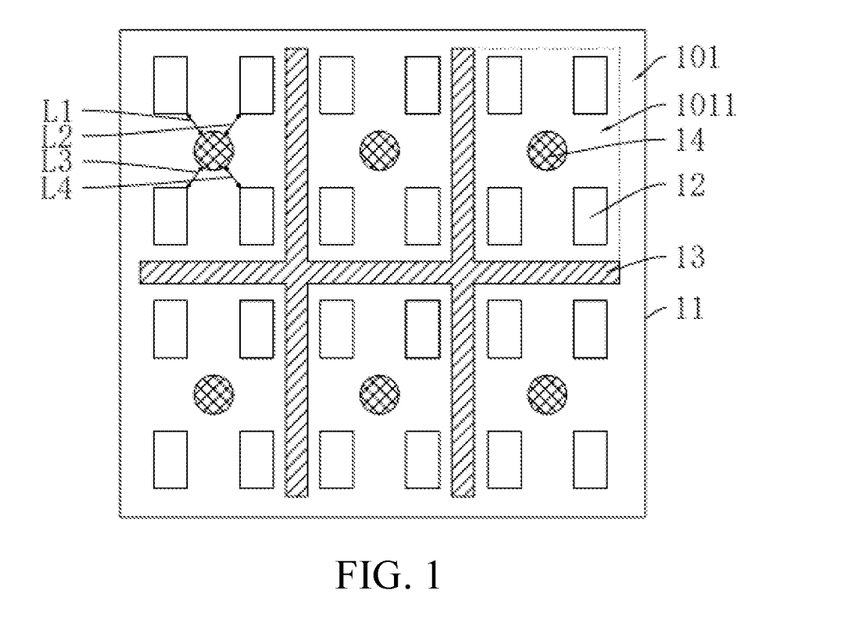
FIG. 1 is a schematic diagram of a plane structure of a display backplane provided by an embodiment of the present application.
Figure 2:
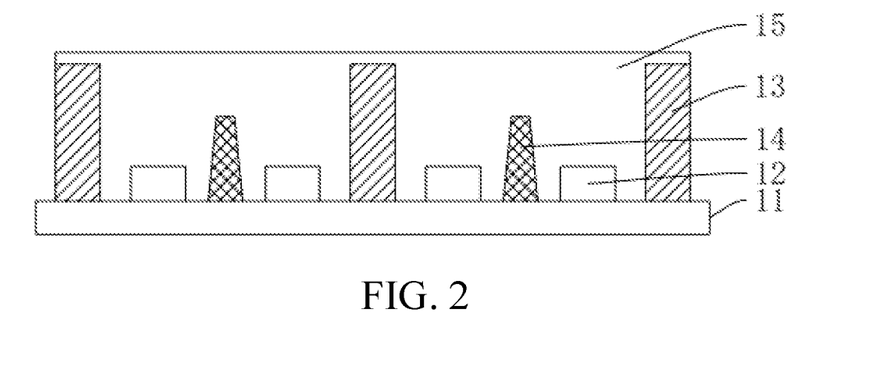
FIG. 2 is a schematic diagram of a cross-sectional structure of a display backplane provided by an embodiment of the present application.

In an embodiment of the present application, referring to FIG. 1 and FIG. 2, the display backplane includes a light-emitting area 101, and the light-emitting area 101 includes a plurality of light-emitting sub-areas 1011. In this embodiment of the present application, a plurality of light-emitting sub-areas 1011 are spaced apart from each other.

The display backplane further includes a substrate 11, a plurality of light-emitting elements 12, a retaining wall structure 13, a first light-guiding portion 14 and an encapsulation adhesive layer 15.

The plurality of light-emitting elements 12 are disposed on the substrate 11 and distributed in the light-emitting area 101, and at least two light-emitting elements 12 are distributed in each of the light-emitting sub-areas 101. Each of the light-emitting sub-areas 101 provided with four light-emitting elements 12 is taken as an example for description, but it is not particularly limited thereto.

Optionally, the light-emitting element 12 may be an LED lamp, specifically, a mini LED lamp, and a light-emitting angle of the light-emitting element 12 may be 60-70°.

Figure 3:
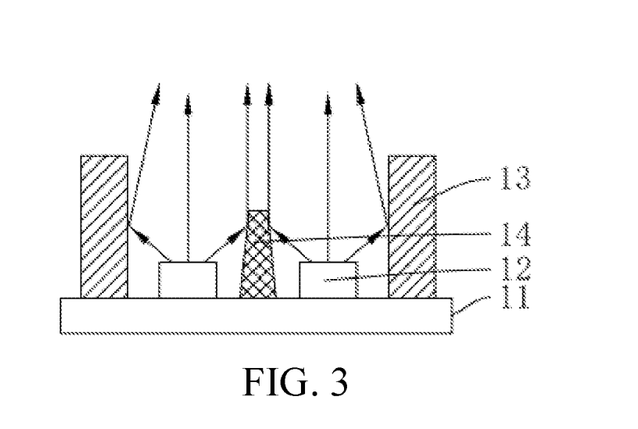
FIG. 3 is a schematic diagram of a light-emitting light path of the light-emitting element provided by an embodiment of the present application.

The retaining wall structure 13 is disposed on the substrate 11 and distributed in the light-emitting area 101, and the retaining wall structure 13 is at least located between adjacent ones of the light-emitting sub-areas 1011, so as to space adjacent ones of the light-emitting sub-areas 1011 apart. In addition, the side of the retaining wall structure 13 close to the light-emitting element 12 is provided with the first light-reflecting surface, so that when the display backplane is controlled to emit light from a single light-emitting sub-area 1011, the light emitted by each of the light-emitting sub-areas 1011 can be prevented from emitting to an adjacent one of the light-emitting sub-areas 1011 to cause an impact, thereby alleviating a halo phenomenon due to light overflow when the display backplane emits light from a single area, as shown in FIG. 3.

Optionally, a height of the retaining wall structure 13 may be greater than or equal to 0.2 mm and less than or equal to 0.3 mm, a material of the retaining wall structure 13 may include an organic resin material, and a reflectivity of the first light-reflecting surface is greater than or equal to 95%.

The first light-guiding portion 14 is disposed on the substrate 11 and located in each of the light-emitting sub-areas 1011, and the first light-guiding portion 14 is disposed between at least two light-emitting elements 12. A second light-reflecting surface is provided on a side of the first light-guiding portion 14 close to the light-emitting elements 1011, and an orthographic projection of a portion of a side of the first light-guiding portion 14 away from the substrate 11 on the substrate 11 falls within an orthographic projection of a portion of a side of the first light-guiding portion 14 close to the substrate 11 on the substrate 11. Further, the first light-guiding portion 14 includes a plurality of light-guiding sub-portions arranged in a direction away from the substrate 11 and between adjacent ones of the light-guiding portions, an orthographic projection of the light-guiding sub-portions at a side away from the substrate 11 on the substrate 11 falls within an orthographic projection of the light-guiding sub-portions at a side close to the substrate 11 on the substrate 11. That is, the second light-reflecting surface is disposed perpendicular to the substrate 11, or inclined to the substrate 11 in a direction away from the adjacent light-emitting elements 12, so that the first light-guiding portion 14 has a structure with a narrow top and a wide bottom, so that the light emitted by the light-emitting elements 12 and reaching the second light-reflecting surface can be reflected and emitted in the forward direction of the display backplane, as shown in FIG. 3, thereby improving the uniformity of the light output intensity of the display backplane.

Optionally, a cross-section of the first light-guiding portion 14 may have a shape of a rectangle, a trapezoid, a cone, or a truncated cone. In addition, under the condition that the first light-reflecting surface is tapered away from the substrate 11, the first light-reflecting surface may also be curved.

In this embodiment, a height of the first light-guiding portion 14 is less than a height of the retaining wall structure 13 and greater than a height of the light-emitting element 12, and further, a reflectivity of the second light-reflecting surface is greater than or equal to 85%.

It should be noted that the heights of the retaining wall structure 13 and the first light-guiding portion 14 can be adjusted according to the light-emitting angle of the light-emitting element 12, so that the light emitted by the light-emitting elements 12 at large angles is reflected by the retaining wall structure 13 or the first light-guiding portion 14 to emit light along the forward direction of the display backplane, so as to improve the light-emitting uniformity in different areas in each of the light-emitting sub-areas 1011. Further, the display backplane also includes a reflective layer (not shown) disposed on the substrate 11, and the material of the reflective layer can be white ink or a reflective metal material, etc., wherein the reflectivity of the second light-reflecting surface is the same as the reflectivity of the reflective layer to prevent a phenomenon of uneven brightness in different areas in each of the light-emitting sub-areas 1011.

In an embodiment of the present application, the plurality of light-emitting elements 12 located in the same light-emitting sub-area 1011 may be disposed around the first light-guiding portion 14; and specifically, disposed around the first light-guiding portion 14 in a rectangular array, or may be disposed around the first light-guiding portion 14 in a ring, which is not particularly limited herein.

Figure 4:
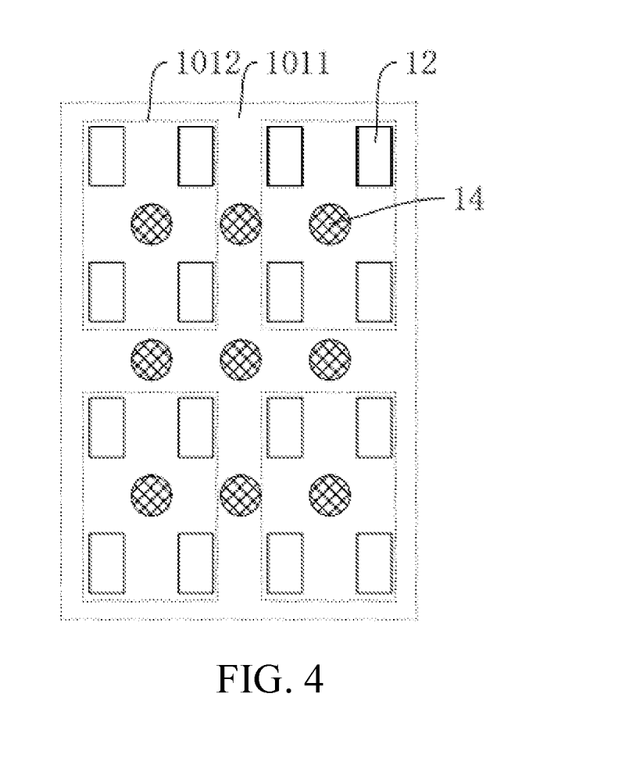
FIG. 4 is a schematic diagram of arrangement of light-emitting elements and a first light-guiding portion in a light-emitting sub-area according to an embodiment of the present application.

Optionally, referring to FIG. 1 and FIG. 4, each of the light-emitting sub-areas 1011 includes at least one light-emitting element group 1012, and each light-emitting element group 1012 includes four light-emitting elements distributed in a rectangular array of two rows and two columns. The four light-emitting elements 12 are respectively located at four corners of the rectangle. The first light-guiding portion 14 is located between two rows of light-emitting elements 12 and between two columns of light-emitting elements 12. Further, the maximum difference in the distances between the first light-guiding portion 14 and the respective light-emitting elements 12 is less than or equal to 0.2 mm. That is, the maximum value of the differences between L1, L2, L3, and L4 shown in FIG. 1 needs to be less than or equal to 0.2 mm to improve the light-guiding effect of the first light-guiding portion 14. It should be noted that L1, L2, L3 and L4 are respectively the shortest distances between the first light-guiding portion 14 and each of the light-emitting elements 12.

Preferably, the first light-guiding portion 14 is located at an intersection of two diagonals of a rectangle formed by the four light-emitting elements 12, so that the distances from the first light-guiding portion 14 to the four light-emitting elements 12 are all equal, that is, L1, L2, L3, and L4 are all equal.

As shown in FIG. 1, each of the light-emitting sub-areas 1011 includes one light-emitting element group 1012; and as shown in FIG. 4, each of the light-emitting sub-areas 1011 includes four light-emitting element groups 1012, and further, in each of the light-emitting sub-areas 1011, the first light-guiding portion 14 between adjacent ones of the light-emitting element groups is located at a symmetrical center of the adjacent ones of the light-emitting element groups. For example, as shown in FIG. 4, a first light-guiding portion 14 is arranged between the two first light-emitting element groups located in the first row, and the two first light-emitting element groups 1012 are distributed symmetrically with respect to the first light-guiding portion 14. A first light-guiding portion 14 is disposed between the two first light-emitting element groups 1012 in the first column in FIG. 4, and the two first light-emitting element groups 1012 are distributed symmetrically with respect to the first light-guiding portion 14; a first light-guiding portion 14 is disposed between two first light-emitting element groups 1012 distributed diagonally in FIG. 4, and the two first light-emitting element groups 1012 are distributed symmetrically with respect to the first light-guiding portion 14; that is, in an embodiment of the present application, the first light-guiding portion 14 can be arranged in each of the light-emitting element groups 1012 and between adjacent ones of the light-emitting element groups 1012 to improve a light output intensity between light-emitting elements in the display backplane and improve a brightness uniformity of the display backplane.

Further, the encapsulation adhesive layer 15 is disposed on the substrate 11, and the side of the encapsulation adhesive layer 15 close to the substrate 11 covers the plurality of light-emitting elements 12, the retaining wall structure 13 and the first light-guiding portion 14, and the side of the encapsulation adhesive layer 15 away from the substrate 11 is a plane, that is, in an embodiment of the present application, the flow range of the encapsulation adhesive is limited by the retaining wall structure 13, resulting in a small flow range of the encapsulation adhesive and a great leveling property, so as to improve a flatness of the encapsulation adhesive layer 15, which is conducive to improving the light output uniformity of the display backplane.

Figure 5:
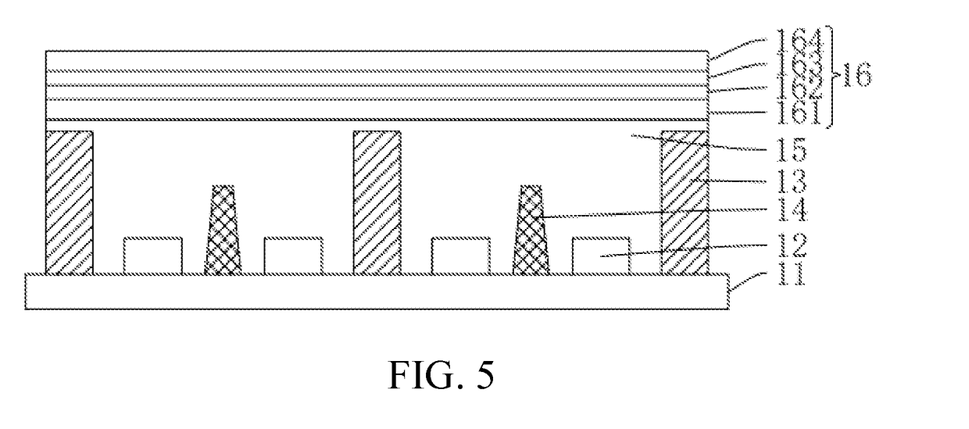
FIG. 5 is a schematic structural diagram of a display backplane provided by an embodiment of the present application.

In addition, referring to FIG. 5, the display backplane further includes an optical film assembly 16 disposed on one side of the plurality of light-emitting elements 12 away from the substrate 11, and the optical film group 16 includes a color conversion film 161, a diffuser sheet 162, a lower prism sheet 163, and an upper prism sheet 164 disposed in sequence on a side of the plurality of light-emitting elements 12 away from the substrate 11. In an embodiment of the present application, due to the reflective light-guiding function of the retaining wall structure 13 and the first light-guiding portion 14, it is possible to increase a light-emitting effect of the plurality of light-emitting elements 12, and a number of the diffuser sheets 162 in the optical film group 16 can be reduced in an embodiment of the present application, thereby reducing the thickness of the display backplane, so as to meet the requirement of thinness and lightness of the display backplane.

It is appreciated that FIG. 5 provided in the present application only shows the types of optical films in the optical film assembly 16, but the number of optical films is not reflected, wherein the number of each film in the optical film assembly 16 may be at least one, which is not particularly limited here.

In view of above, in an embodiment of the present application, the first light-guiding portion 14 is disposed in each of the light-emitting sub-areas 1011 of the display backplane, the first light-guiding portion 14 is located between the at least two light-emitting elements 12, the second light-reflecting surface is provided on a side of the first light-guiding portion 14 close to the light-emitting elements 12, and the second light-reflecting surface is arranged in an inclination direction, that is, the second light-reflecting surface is arranged in a direction perpendicular to the substrate or arranged divergently in a direction away from the substrate, so that the light irradiated on the first light-guiding portion 14 can emit in a direction that is biased towards a forward direction of the display backplane, so as to improve a light output intensity between the light-emitting elements 12 in the display backplane, improve the uneven display of the display backplane, and improve the brightness uniformity of the display backplane.

Figure 6:
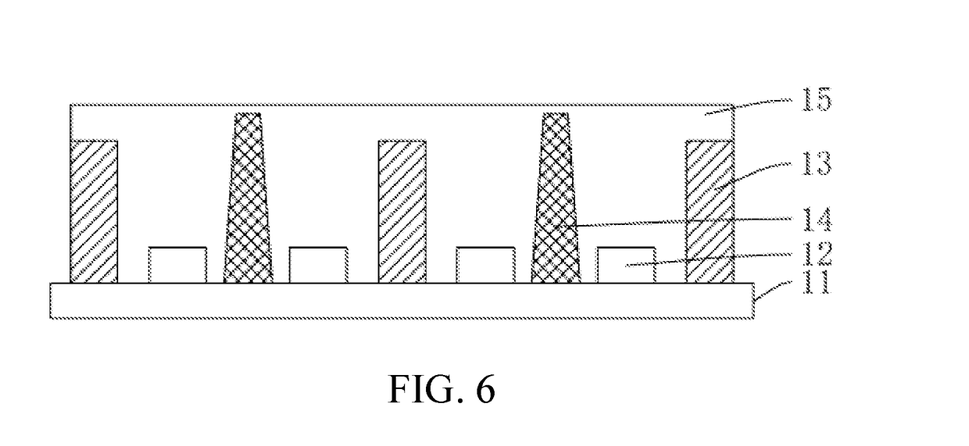
FIG. 6 is a schematic diagram of another cross-sectional structure of the display backplane provided by an embodiment of the present application.

In another embodiment of the present application, referring to FIG. 1 and FIG. 6, the difference between this embodiment and the previous embodiment is that the height of the first light-guiding portion 14 is greater than the height of the retaining wall structure 13, and further, in this embodiment, the first light-guiding portion 14 can support the optical film assembly, which can increase the distance between the light-emitting element 12 and the optical film group, that is, can increase the light mixing distance after light emitted from the light-emitting element 12 in the display backplane, thereby improving the light mixing effect of the display backplane and improving the light mixing characteristics of the display backplane.

In view of above, in an embodiment of the present application, the light irradiated on the first light-guiding portion 14 can emit in a direction that is biased towards a forward direction of the display backplane, so as to improve a light output intensity between the light-emitting elements 12 in the display backplane, improve the uneven display of the display backplane, and improve the brightness uniformity of the display backplane. In addition, compared with the previous embodiment, this embodiment can increase the light mixing distance of the display backplane and improve the light mixing effect of the display backplane.

Figure 7:
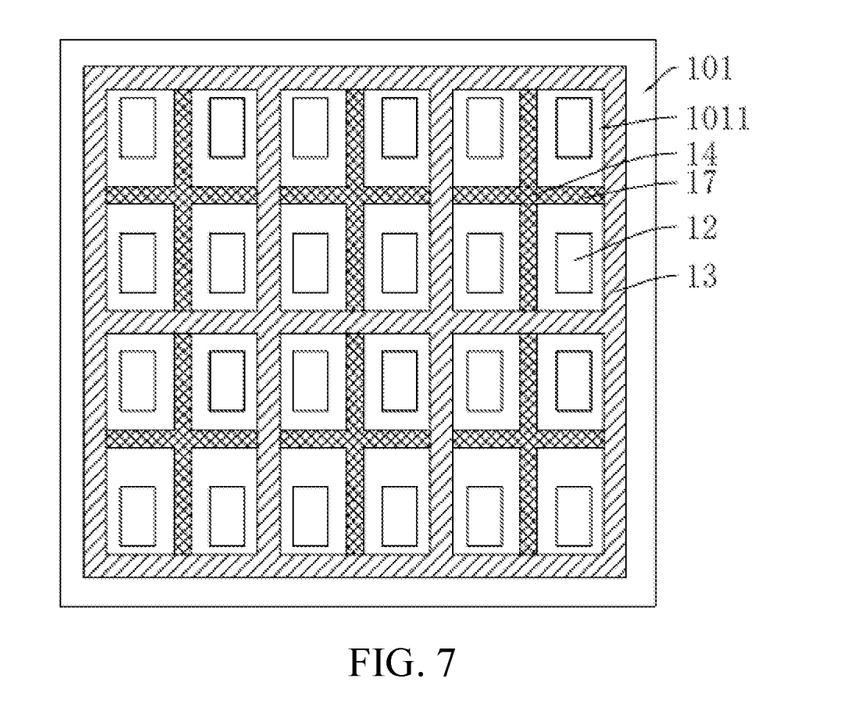
FIG. 7 is a schematic diagram of another plane structure of a display backplane provided by an embodiment of the present application.
Figure 8:
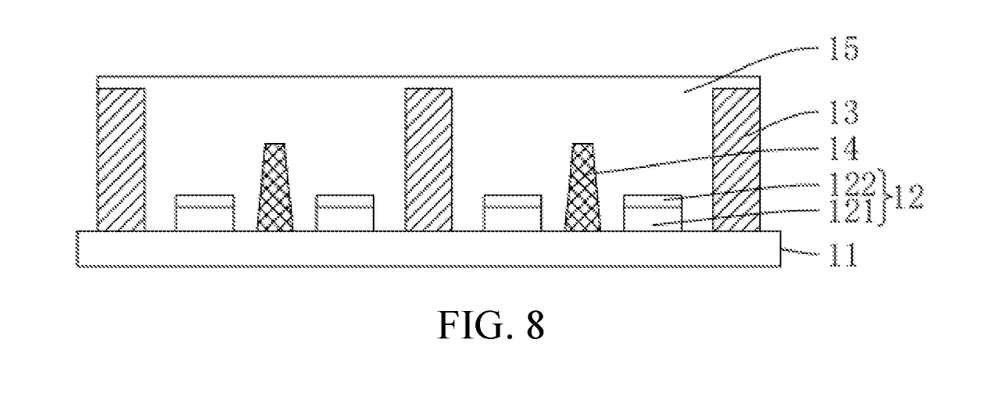
FIG. 8 is another schematic cross-sectional structure diagram of a display backplane provided by an embodiment of the present application.
Figure 9:
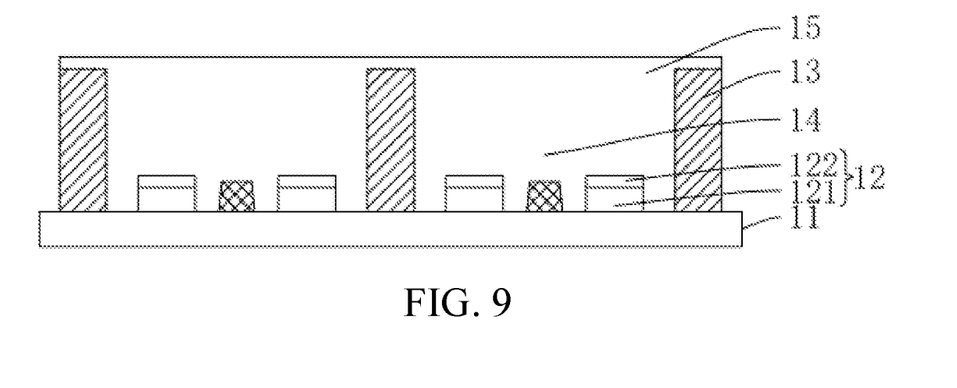
FIG. 9 is a schematic diagram of another cross-sectional structure of a display backplane provided by an embodiment of the present application.

In another embodiment of the present application, referring to FIG. 7, FIG. 8 and FIG. 9, the difference between this embodiment and the first embodiment is that the retaining wall structure 13 is arranged around each of the light-emitting sub-areas 1011, and the display backplane also includes a second light-guiding portion 17 connected between the first light-guiding portion 14 and the retaining wall structure 13, and in each of the light-emitting sub-areas 1011, the second light-guiding portion 17 is provided between any adjacent ones of the light-emitting elements 12, and a third light-reflecting surface is provided on the side of the second light-guiding portion 17 close to the light-emitting elements 12.

In this embodiment, the height of the second light-guiding portion 17 is smaller than the height of the first light-guiding portion 14 and smaller than the height of the light-emitting element 12. Since in each of the light-emitting sub-areas 1011, the second light-guiding portion 17 is provided between adjacent ones of the light-emitting elements 12, the height of the second light-guiding portion 17 is set to be smaller than the height of the light-emitting element 12, so as to prevent the second light-guiding portion 17 from blocking light laterally emitted from each of the light-emitting elements 12 in each of the light-emitting sub-areas 1011.

Optionally, the first light-guiding portion 14 and the second light-guiding portion 17 are integrally formed, and the first light-guiding portion 14, the second light-guiding portion 17, and the retaining wall structure 13 are connected to space the plurality of light-emitting elements 12 apart, so that the adjacent light-emitting elements 12 are spaced apart from each other by the second light-guiding portion 17 or by the retaining wall structure 13. The height of the first light-guiding portion 14 may also be smaller than the height of the light-emitting element 12, and in this embodiment, the first light-guiding portion 14 and the second light-guiding portion 17 are connected and disposed between the plurality of light-emitting elements 12. In addition, the sides of the first light-guiding portion 14 and the second light-guiding portion 17 close to the light-emitting elements 12 are provided with light-reflecting surfaces, thereby improving the overall reflectivity of light in the display backplane, and improving the light utilization rate and the light output intensity. In this case, the height of the first light-guiding portion 14 is greater than the height of the second light-guiding portion 17, and the height difference between the first light-guiding portion 14 and the second light-guiding portion 17 is 0.01 mm to 0.1 mm; and in an embodiment of the present application, the height of the first light-guiding portion 14 being greater than the height of the light-emitting member 12 is taken as an example for description.

Further, each of the light-emitting elements 12 includes a connecting sub-portion 121 disposed on the substrate 11 and a light-emitting sub-portion 122 disposed on a side of the connecting sub-portion 121 away from the substrate 11, wherein the connecting sub-portion 121 may be connected to the wiring on the substrate 11. The light-emitting sub-portion 122 can be an LED chip connected to the pad to realize light emission. In addition, the display backplane also includes a reflective layer disposed on the substrate 11, and the reflective layer is provided with an opening (not shown) corresponding to each of the light-emitting elements 12. In this embodiment, the height of the first light-guiding portion 14 can be greater than the height of the light-emitting element 12 and less than the height of the retaining wall structure 13, and the height of the second light-guiding portion 17 may be greater than the height of the connecting sub-portion 121 and less than a sum of the heights of the connecting sub-portion 121 and the light-emitting sub-portion 122.

Optionally, in an embodiment of the present application, the height of the retaining wall structure 13 may be greater than or equal to 0.3 mm and less than or equal to 1 mm, and a distance between the opening of the reflective layer corresponding to each light-emitting element 12 and an adjacent one of the retaining wall structures 13 is less than or equal to 0.3 mm, and an aspect ratio of the retaining wall structure 13 may be 1:2 to 2:1.

In addition, a material of the retaining wall structure 13 includes high reflectivity and high viscosity adhesive material, and the reflectivity of the first light-reflecting surface can be greater than or equal to 80%, and less than or equal to 95%, a viscosity of the material of the retaining wall structure 13 may be 105 cps to 106 cps.

The aspect ratio of the first light-guiding portion 14 and the second light-guiding portion 17 is 1:5 to 1:10, and the height of the second light-guiding portion 17 is greater than or equal to 0.1 mm and less than or equal to 0.3 mm. The reflectivity of the second light-reflecting surface is equal to the reflectivity of the third light-reflecting surface, and is greater than or equal to the reflectivity of the first light-reflecting surface. Optionally, the reflectivity of the second light-reflecting surface and the reflectivity of the third light-reflecting surface both may be greater than or equal to 85%, and less than or equal to 99%. Further, in each of the light-emitting sub-areas 1011, the distance between the opening of each of the light-emitting elements 12 and the adjacent first light-guiding portion 14 or second light-guiding portion 17 is less than or equal to 0.2 mm, so that the first light-guiding portion 14 and the second light-guiding portion 17 can cover the substrate 11 as much as possible, so as to improve the light-emitting effect of the display backplane.

Further, the plurality of light-emitting elements 12 may be distributed at equal or unequal intervals on the substrate 11; when the plurality of light-emitting elements 12 are distributed on the substrate 11 at unequal intervals, in the adjacent ones of the light-emitting sub-areas 1011, a distance between one of the light-emitting elements 12 in one of the light-emitting sub-areas 1011 close to an adjacent one of the light-emitting sub-areas 1011 and one of the light-emitting elements 12 in the adjacent one of the light-emitting sub-areas 1011 close to the one of the light-emitting sub-areas 1011 is less than or equal to distances between adjacent ones of the light-emitting elements 12 within each of the light-emitting sub-areas 1011.

Optionally, in adjacent ones of the light-emitting sub-areas 1011, the distance between one of the light-emitting elements 12 in one of the light-emitting sub-areas 1011 close to an adjacent one of the light-emitting sub-areas 1011 and one of the light-emitting elements 12 in the adjacent one of the light-emitting sub-areas 1011 close to the one of the light-emitting sub-areas 1011 is greater than or equal to 1 mm and less than or equal to 3 mm; the distance between adjacent ones of the light-emitting elements 11 in each of the light-emitting sub-areas 1011 is greater than or equal to 1 mm and less than or equal to 5 mm.

In this embodiment, the encapsulation adhesive layer 15 is disposed on the substrate 11, and the side of the encapsulation adhesive layer 15 close to the substrate 11 covers the plurality of light-emitting elements 12, the retaining wall structure 13 and the first light-guiding portion 14, and the side of the encapsulation adhesive layer 15 away from the substrate 11 is a plane, that is, in an embodiment of the present application, the flow range of the encapsulation adhesive is limited by the retaining wall structure 13, resulting in a small flow range of the encapsulation adhesive and a great leveling property, so as to improve a flatness of the encapsulation adhesive layer 15, which is conducive to improving the light output uniformity of the display backplane.

Figure 10:
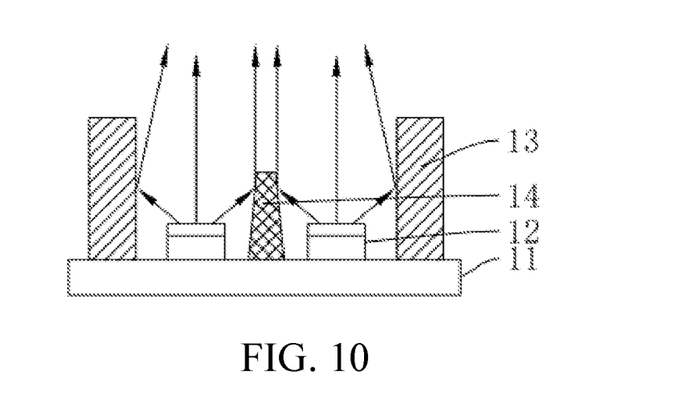
FIG. 10 is a schematic diagram of a light-emitting light path according to an embodiment of the present application.
Figure 11:
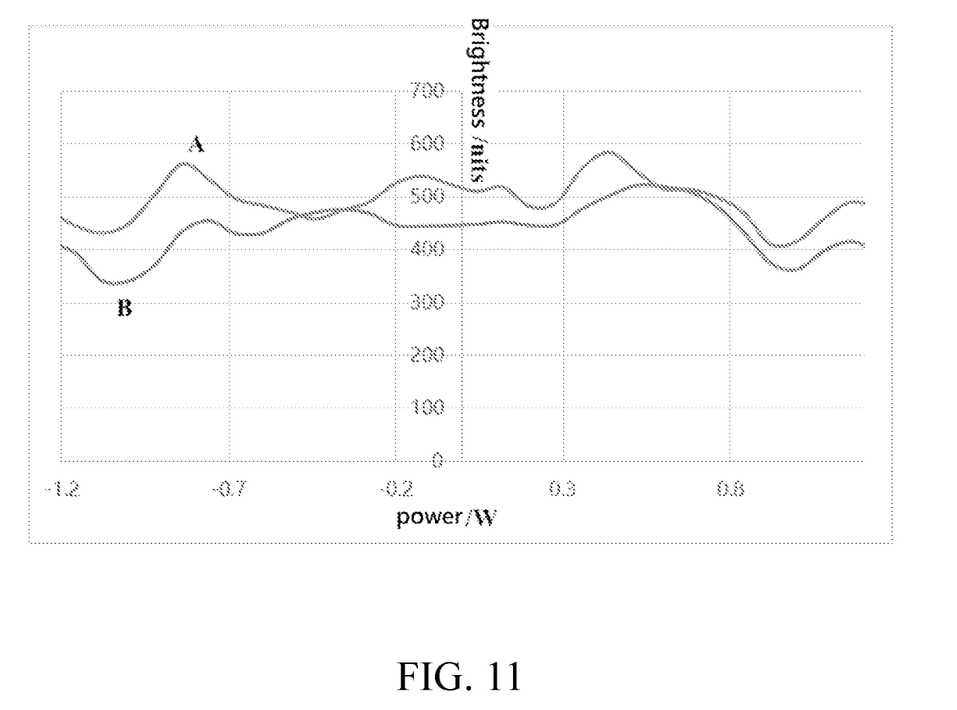
FIG. 11 is a curve diagram of brightness versus power of a display backplane provided by an embodiment of the present application.
Figure 12A:
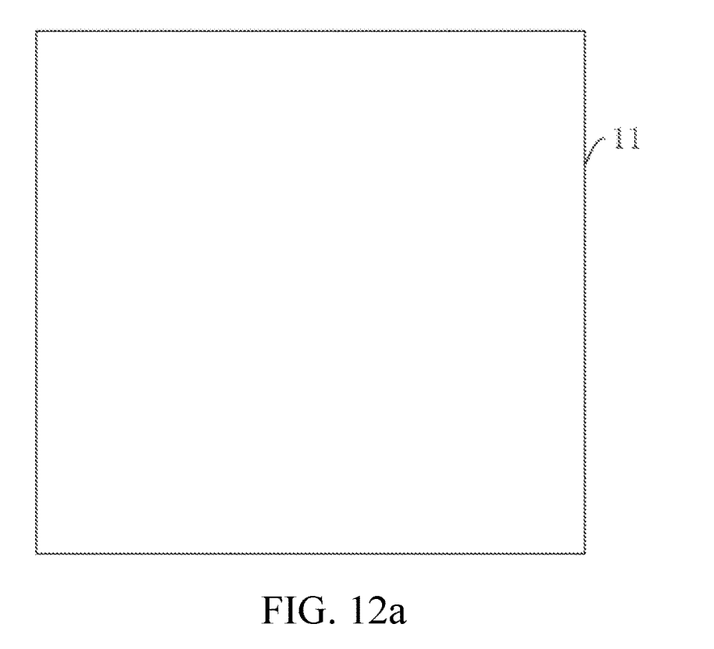
FIG. 12a to FIG. 12f are schematic structural diagrams in a process of manufacturing a display backplane provided by an embodiment of the present application.
Figure 12B:
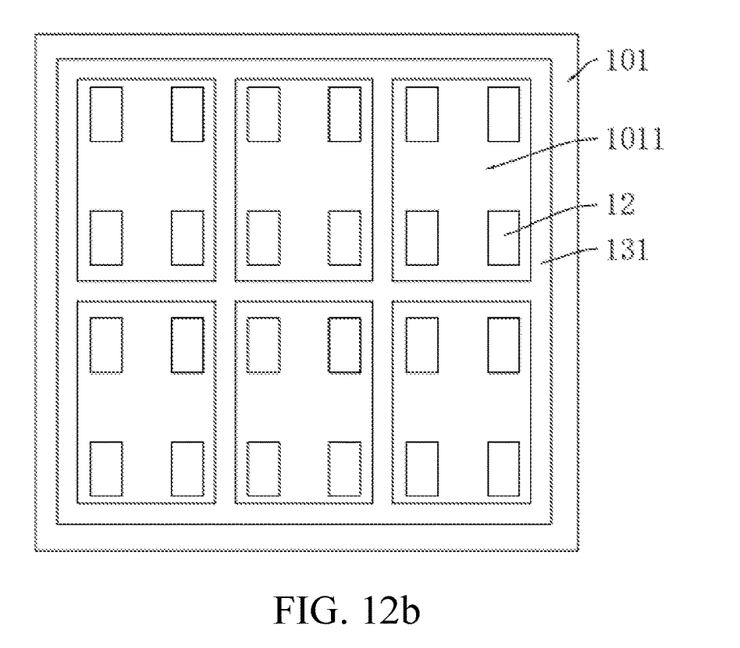
Figure 12C:
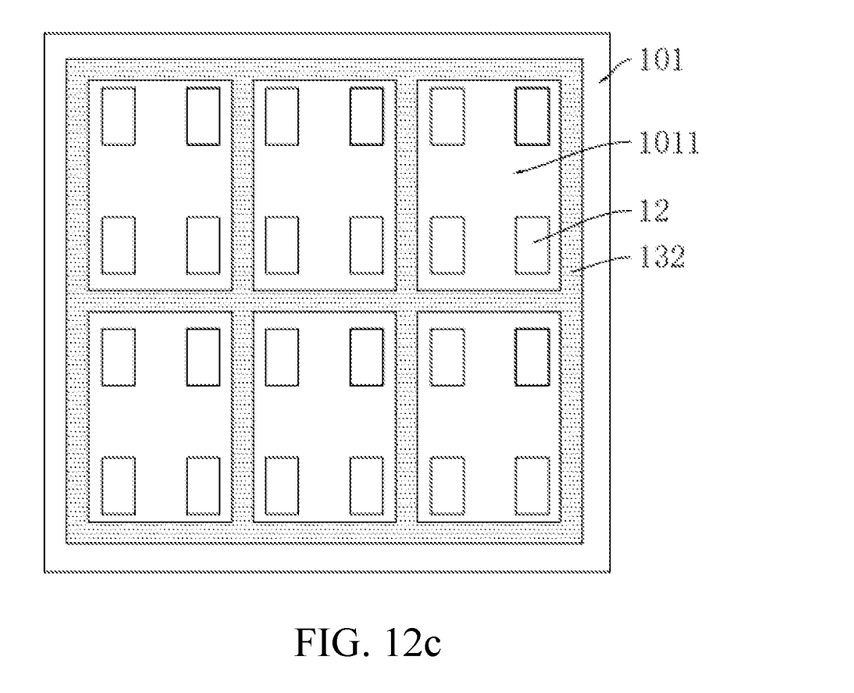
Figure 12D:
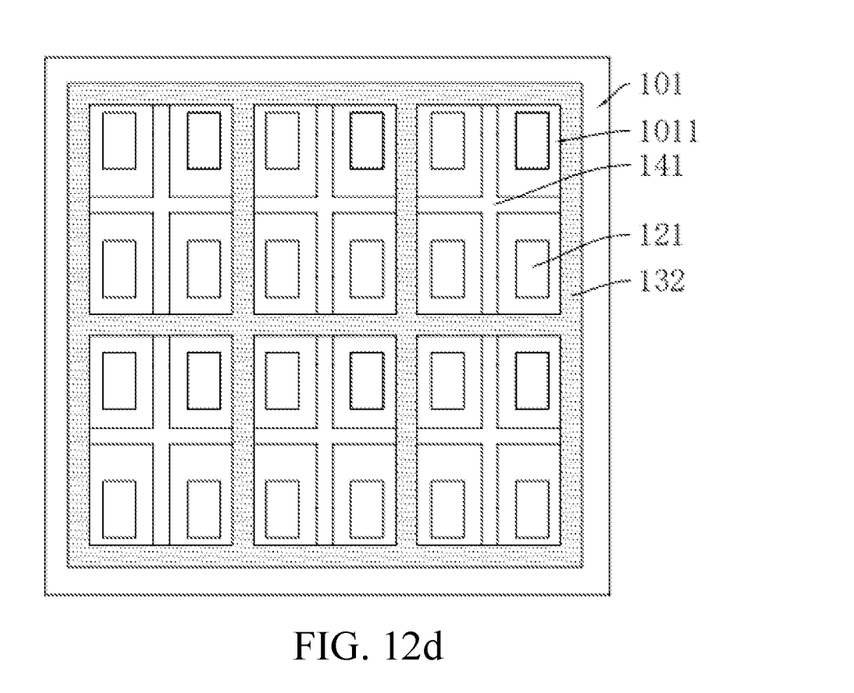
Figure 12E:
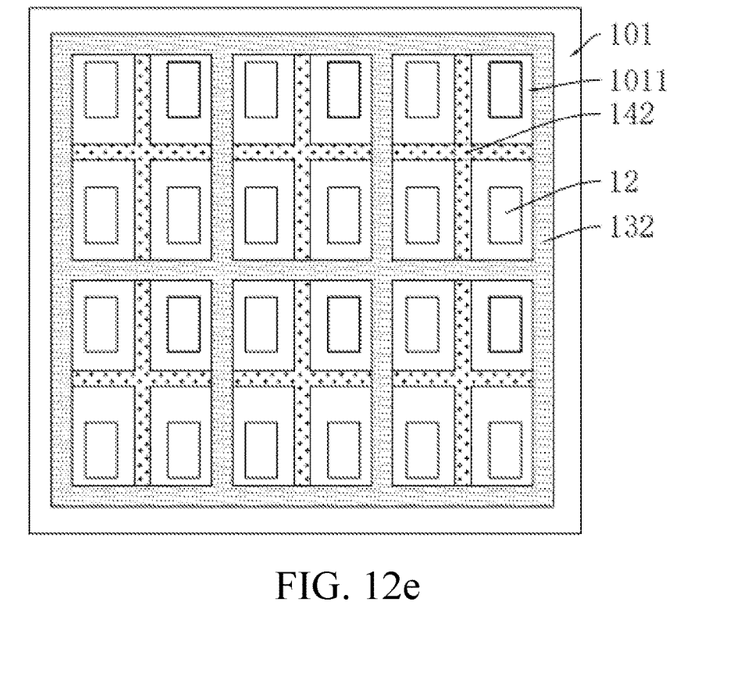
Figure 12F:
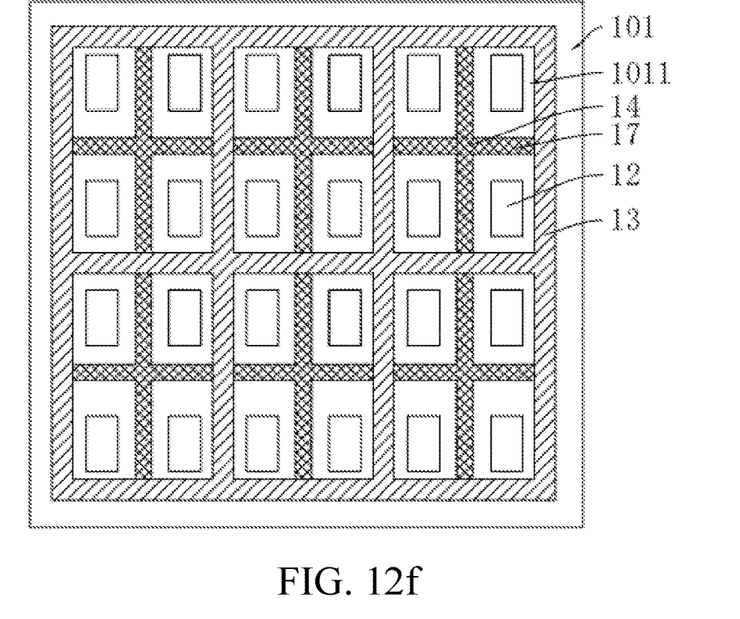

In addition, referring to FIG. 10 and FIG. 11, in an embodiment of the present application, by adding the first light-guiding portion 14 and the second light-guiding portion 17, while improving the brightness between the adjacent light-emitting elements 12, since the sides of the retaining wall structure 13, the first light-guiding portion 14, and the second light-guiding portion 17 close to the light-emitting elements 12 are provided with light-reflecting surfaces, the overall reflectivity of light in the display backplane can be improved, thereby improving the light utilization rate and the light output intensity. The graph shown in FIG. 10 is, under the same power, a luminous brightness curve A of the display backplane using the retaining wall structure 13, the first light-guiding portion 14, and the second light-guiding portion 17 in this embodiment, and a luminous brightness curve B of the conventional display backplane including the same structure except the retaining wall structure 13, the first light-guiding portion 14, and the second light-guiding portion 17, wherein the abscissa represents the power and the ordinate represents the brightness. It can be seen that in under the same power, the brightness of the A curve is basically greater than that of the B curve, which means that in an embodiment of the present application, the retaining wall structure 13, the first light-guiding portion 14 and the second light-guiding portion 17 provided in the display backplane can effectively improve the light output efficiency and brightness of the display backplane.

In view of above, in an embodiment of the present application, the light irradiated on the first light-guiding portion 14 can emit in a direction that is biased towards a forward direction of the display backplane, so as to improve a light output intensity between the light-emitting elements 12 in the display backplane, improve the uneven display of the display backplane, and improve the brightness uniformity of the display backplane. In addition, in this embodiment, on the basis of the first light-guiding portion 14, the second light-guiding portion 17 is further introduced, and a third light-reflecting surface is provided on the side of the second light-guiding portion 17 close to the light-emitting elements 12. As such, compared with the previous two embodiments, this embodiment can effectively improve the overall reflectivity of the display backplane to light, and can improve the light-emitting efficiency and intensity of the display backplane, thereby improving the brightness of the display backplane.

In addition, an embodiment of the present application also provides a method of fabricating the display backplane described in the above-mentioned embodiments, and this embodiment of the present application are described by taking the structure of the display backplane described in the third embodiment as an example. Details can be referred to FIG. 7 and FIGS. 12a to 12f, the display backplane includes a light-emitting area 101, and the light-emitting area 101 includes a plurality of light-emitting sub-areas 1011.

First, a substrate 11 is provided, and a plurality of light-emitting elements 12 are formed in the light-emitting area 101 on the substrate 11, and at least two light-emitting elements 12 are disposed in each of the light-emitting sub-areas 1011.

Then, a first dam adhesive layer 131 may be formed on the substrate 11 by dispensing, and the first dam adhesive layer 131 may be pre-cured through a UV curing or thermal curing process to form a second dam adhesive layer 132, wherein the second dam adhesive layer 132 is arranged around each of the light-emitting sub-areas 1011.

Next, a third dam adhesive layer 141 can be formed in each of the light-emitting sub-areas 1011 on the substrate 11 by dispensing, and the third dam adhesive layer 141 is pre-cured by a UV curing or thermal curing process to form a fourth dam adhesive layer 142, wherein the fourth dam adhesive layer 142 is connected to the second dam adhesive layer 132, and a height of the fourth dam adhesive layer 142 at the position where a cross is formed has a height greater than a height of the area.

Finally, an entire surface of the substrate 11 is encapsulated with an encapsulation adhesive, and the encapsulation adhesive, the second dam adhesive layer 132, and the fourth dam adhesive layer 142 are cured by UV curing or baking to form an encapsulation adhesive layer 15, the retaining wall structure 13, and a first light-guiding portion 14 at the position where the fourth dam adhesive layer 142 forms the cross, and the second light-guiding portion 17 at other positions of the fourth dam adhesive layer 142.

Figure 13:
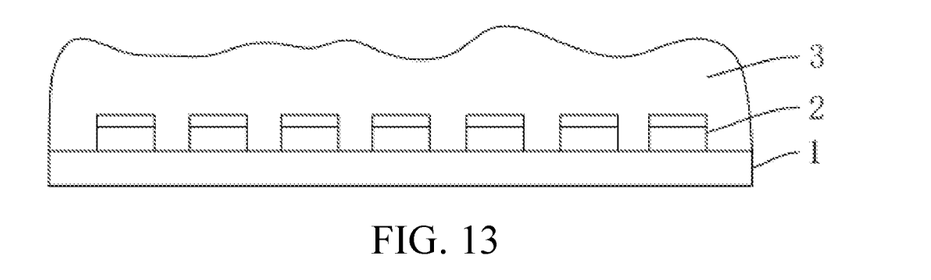
FIG. 13 is a schematic structural diagram of a lamp panel in the prior art.

Referring to FIG. 13, FIG. 13 is a schematic structural diagram of encapsulation with the encapsulation adhesive when a retaining wall structure is provided in the related art, which includes a substrate 1, a light-emitting element 2, and an encapsulation adhesive 3. Since a flow range of encapsulation adhesive is relatively large during the manufacturing process, the leveling property is thus poor, and the final encapsulation adhesive 3 has many bumps and pits, which will seriously impact the light-emitting effect of the display backplane. In an embodiment of the present application, the flow range of the encapsulation adhesive is restricted by the retaining wall structure 13, thereby improving flatness of the encapsulation adhesive layer 15 to improve the light-emitting effect of the display backplane.

In addition, a display device is provided, which includes a display panel and the display backplane described in the above embodiments, the display panel and the display backplane are disposed opposite to each other, and the display panel is located on a side of the plurality of light-emitting elements away from the substrate.

In the above embodiments, the descriptions of each embodiment have their own emphasis. The parts that are not described in detail in an embodiment can be referred to the detailed descriptions in other embodiments above, which will not be repeated herein for brevity.

The display backplane and the display device provided in the embodiments of the present application have been described in detail above. Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A display backplane, comprising a light-emitting area, and the light-emitting area comprising a plurality of light-emitting sub-areas;
the display backplane further comprising:
a substrate;
a plurality of light-emitting elements disposed on the substrate and located in the light-emitting area, wherein each of the light-emitting sub-areas is provided with at least two of the light-emitting elements;
a retaining wall structure disposed on the substrate and disposed around the light-emitting sub-areas, so that the adjacent ones of the light-emitting sub-areas are spaced apart from each other, wherein a first light-reflecting surface is provided on a side of the retaining wall structure close to the light-emitting elements;
a first light-guiding portion disposed in each of the light-emitting sub-areas and between at least two of the light-emitting elements, wherein a second light-reflecting surface is provided on a side of the first light-guiding portion close to the light-emitting elements, and an orthographic projection of a portion of a side of the first light-guiding portion away from the substrate on the substrate falls within an orthographic projection of a portion of a side of the first light-guiding portion close to the substrate on the substrate; and
a second light-guiding portion connected between the first light-guiding portion and the retaining wall structure, wherein, in each of the light-emitting sub-areas, the second light-guiding portion is provided between adjacent ones of the light-emitting elements, and a side of the second light-guiding portion close to the light-emitting elements is provided with a third light-reflecting surface, and wherein a height of the second light-guiding portion is smaller than a height of the first light-guiding portion and smaller than a height of the light-emitting elements.

2. The display backplane according to claim 1, wherein at least one light-emitting element group is disposed in each of the light-emitting sub-areas, and each of the light-emitting element group comprises a plurality of the light-emitting elements, wherein in each of the light-emitting element group, the plurality of the light-emitting elements are arranged around the first light-guiding portion.

3. The display backplane according to claim 2, wherein each of the light-emitting element group comprises four light-emitting elements arranged in an array along a first direction and a second direction, and the first direction is perpendicular to the second direction;
wherein, in each of the light-emitting element group, a maximum difference between distances between the first light-guiding portion and each of the light-emitting elements is less than or equal to 0.2 mm.

4. The display backplane according to claim 3, wherein, in each of the light-emitting sub-areas, the first light-guiding portion between adjacent ones of light-emitting groups is located at a symmetrical center of adjacent ones of the light-emitting groups.

5. The display backplane according to claim 1, wherein the display backplane further comprises an optical film assembly disposed at a side of the plurality of light-emitting elements away from the substrate, the optical film assembly comprises a diffuser sheet, and a number of the diffuser sheet is less than 3.

6. The display backplane according to claim 1, wherein a height of each of the light-emitting elements is smaller than a height of the retaining wall structure and smaller than a height of the first light-guiding portion.

7. The display backplane according to claim 1, wherein a reflectivity of the first light-reflecting surface is greater than or equal to 95%, and a reflectivity of the second light-reflecting surface is greater than or equal to 85%.

8. The display backplane according to claim 1, wherein the light-emitting elements comprise a connecting sub-portion disposed on the substrate and a light-emitting sub-portion disposed at a side of the connecting sub-portion away from the substrate; and a height of the second light-guiding portion is greater than a height of the connecting sub-portion, and is smaller than a sum of heights of the connecting sub-portion and the light-emitting sub-portion.

9. The display backplane according to claim 1, wherein a material of the first light-guiding portion is same as a material of the second light-guiding portion, a reflectivity of the second light-reflecting surface is equal to a reflectivity of the third light-guiding portion, and a reflectivity of the third light-reflecting surface is greater than or equal to a reflectivity of the first light-reflecting surface.

10. The display backplane according to claim 9, wherein the reflectivity of the first light-reflecting surface is greater than or equal to 80% and less than or equal to 95%, and the reflectivity of the second light-reflecting surface is greater than or equal to 85% and less than or equal to 99%.

11. The display backplane according to claim 1, wherein in adjacent ones of the light-emitting sub-areas, a distance between one of the light-emitting elements in one of the light-emitting sub-areas close to an adjacent one of the light-emitting sub-areas and one of the light-emitting elements in the adjacent one of the light-emitting sub-areas close to the one of the light-emitting sub-areas is less than or equal to distances between adjacent ones of the light-emitting elements within each of the light-emitting sub-areas.

12. The display backplane according to claim 1, wherein the display backplane further comprises an encapsulation adhesive layer disposed on the substrate; a side of the encapsulation adhesive layer close to the substrate covers the plurality of the light-emitting elements, the first light-guiding portion, and the retaining wall structure; and a side of the encapsulation adhesive layer away from the substrate is a plane.

13. The display backplane according to claim 1, wherein the first light-guiding portion comprises a plurality of light-guiding sub-portions arranged in a direction away from the substrate, and between adjacent ones of the light-guiding sub-portions, an orthographic projection of the light-guiding sub-portions at a side away from the substrate on the substrate falls within an orthographic projection of the light-guiding sub-portions at a side close to the substrate on the substrate.

14. A display device, comprising a display panel and a display backplane, wherein the display panel and the display backplane are disposed opposite to each other, and the display panel is located at a side of a plurality of light-emitting elements away from a substrate;
wherein the display backplane comprises a light-emitting area, and the light-emitting area comprises a plurality of light-emitting sub-areas; and
wherein the display backplane further comprises:
the substrate;
the plurality of light-emitting elements disposed on the substrate and located in the light-emitting area, wherein each of the light-emitting sub-areas is provided with at least two of the light-emitting elements;
a retaining wall structure disposed on the substrate and disposed around the light-emitting sub-areas, so that the adjacent ones of the light-emitting sub-areas are spaced apart from each other, wherein a first light-reflecting surface is provided on a side of the retaining wall structure close to the light-emitting elements;
a first light-guiding portion disposed in each of the light-emitting sub-areas and between at least two of the light-emitting elements, a second light-reflecting surface is provided on a side of the first light-guiding portion close to the light-emitting elements, and an orthographic projection of a portion of a side of the first light-guiding portion away from the substrate on the substrate falls within an orthographic projection of a portion of a side of the first light-guiding portion close to the substrate on the substrate; and
a second light-guiding portion connected between the first light-guiding portion and the retaining wall structure, wherein, in each of the light-emitting sub-areas, the second light-guiding portion is provided between adjacent ones of the light-emitting elements, and a side of the second light-guiding portion close to the light-emitting elements is provided with a third light-reflecting surface, and wherein a height of the second light-guiding portion is smaller than a height of the first light-guiding portion and smaller than a height of the light-emitting elements.

15. The display device according to claim 14, wherein at least one light-emitting element group is disposed in each of the light-emitting sub-areas, and each of the light-emitting element group comprises a plurality of the light-emitting elements, wherein in each of the light-emitting element group, the plurality of the light-emitting elements are arranged around the first light-guiding portion.

16. The display device according to claim 15, wherein each of the light-emitting element group comprises four light-emitting elements arranged in an array along a first direction and a second direction, and the first direction is perpendicular to the second direction;
wherein, in each of the light-emitting element group, a maximum difference between distances between the first light-guiding portion and each of the light-emitting elements is less than or equal to 0.2 mm.

17. The display device according to claim 16, wherein, in each of the light-emitting sub-areas, the first light-guiding portion between adjacent ones of light-emitting groups is located at a symmetrical center of adjacent ones of the light-emitting groups.

* * * * *